P. C. FLAGSTAD & W. SANDS.
FOLDING BOX OR CRATE.
APPLICATION FILED NOV. 8, 1915.

1,219,280.

Patented Mar. 13, 1917.
4 SHEETS—SHEET 1.

INVENTORS: P.C. Flagstad, Walter Sands,
BY their ATTORNEY A. M. Carlsen.

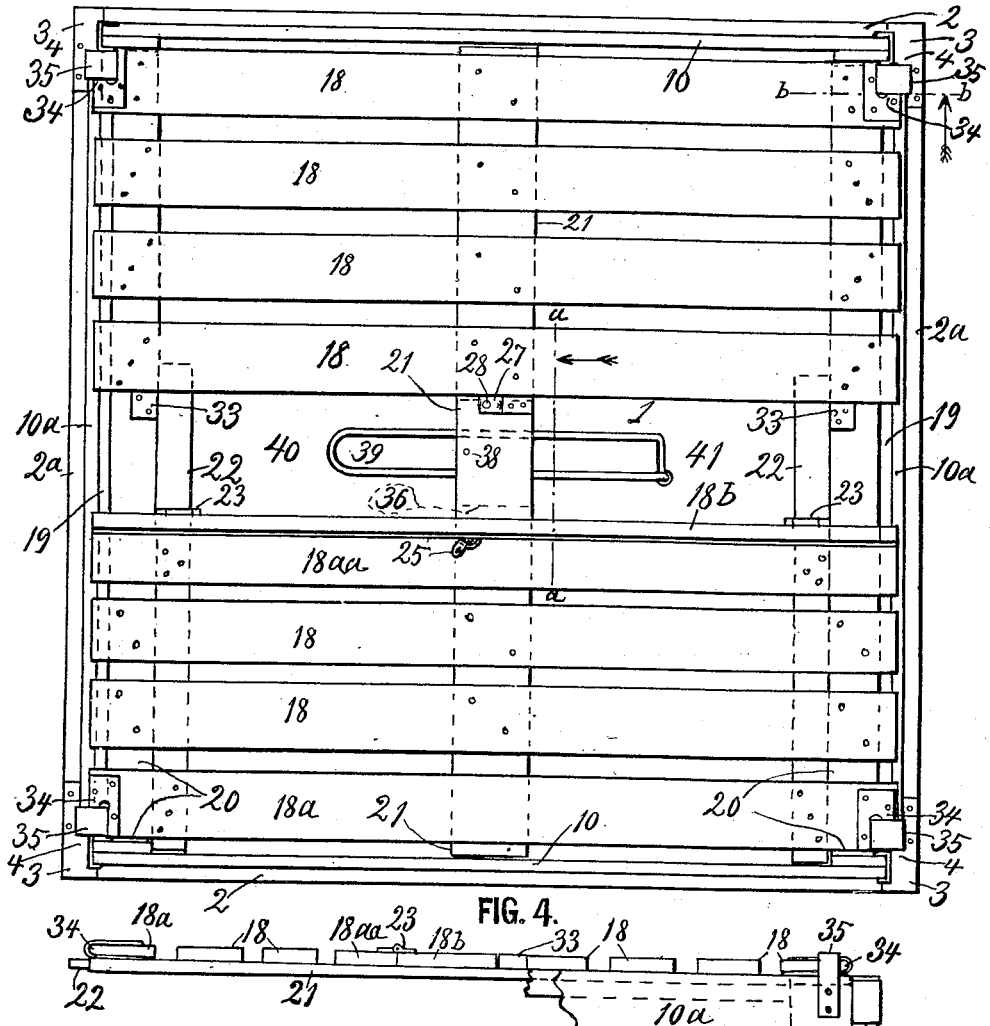

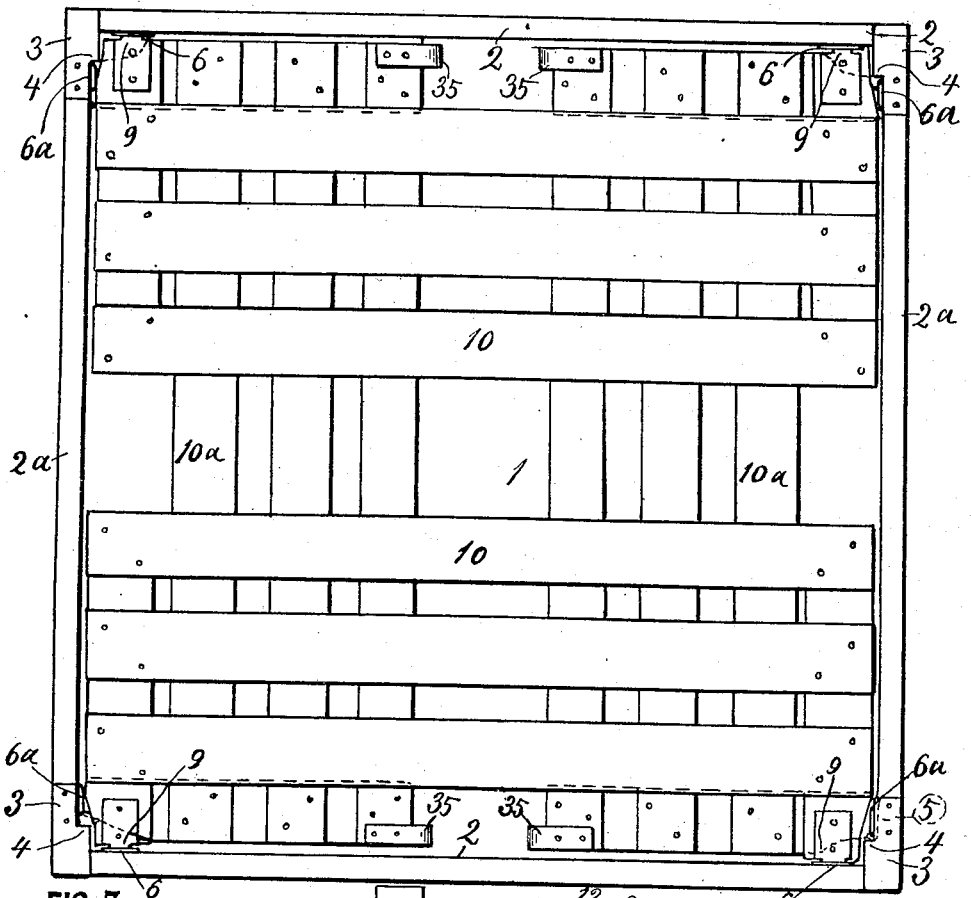
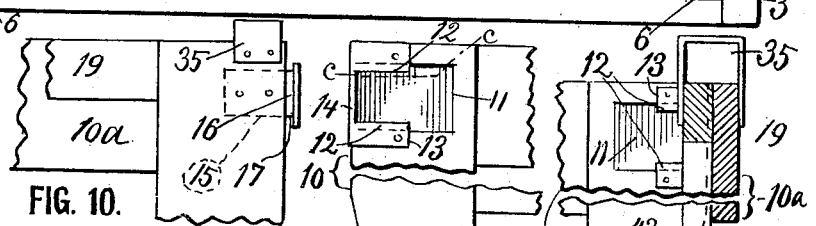
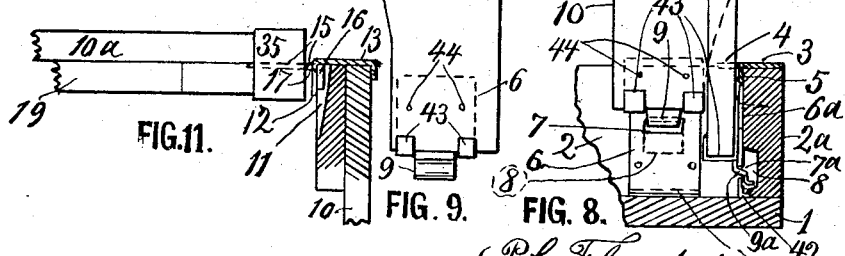

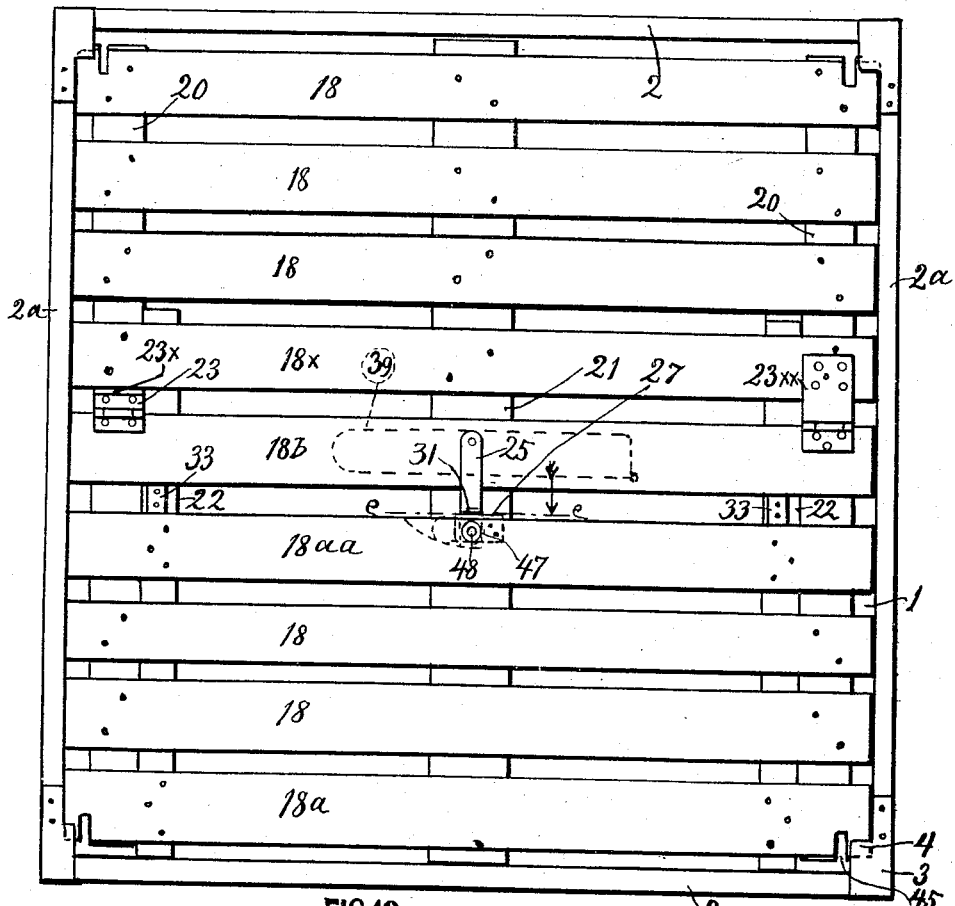

ns and the cover of the 60
UNITED STATES PATENT OFFICE.

PETER CORNEL FLAGSTAD, OF MINNEAPOLIS, AND WALTER SANDS, OF KENYON, MINNESOTA, ASSIGNORS TO FOLDING CRATE AND BOX COMPANY, OF MINNEAPOLIS, MINNESOTA, A CORPORATION.

FOLDING BOX OR CRATE.

1,219,280.     Specification of Letters Patent.     Patented Mar. 13, 1917.

Application filed November 2, 1915. Serial No. 60,257.

*To all whom it may concern:*

Be it known that we, PETER CORNEL FLAGSTAD and WALTER SANDS, citizens of the United States, residing at Minneapolis, in the county of Hennepin, and at Kenyon, in the county of Goodhue, State of Minnesota, respectively, have invented a new and useful Folding Box or Crate, of which the following is a specification.

Our invention relates to folding boxes and crates, and the main objects are, to provide an improved sanitary and durable article of said kind in general, and to provide a very convenient crate for shipping birds, chickens and other fowls and animals.

Figure 1:
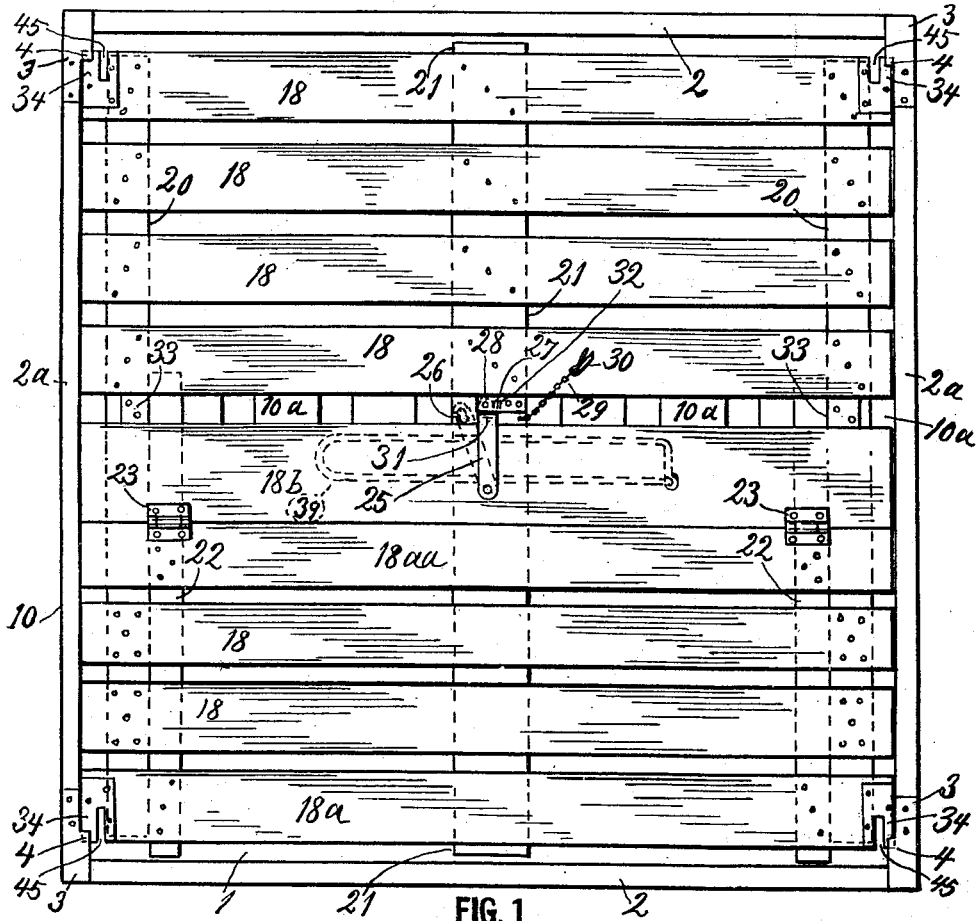
Figure 2:
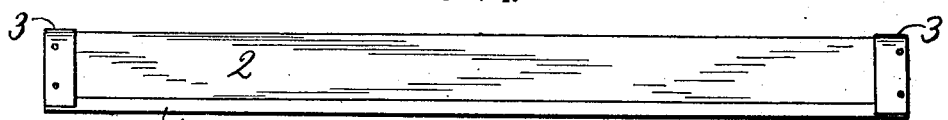
Figure 3:
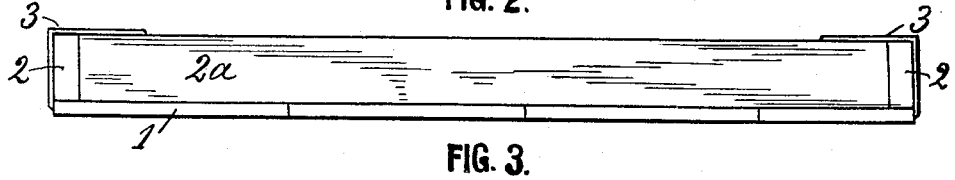

In the accompanying drawings, Figure 1 is a top or plan view of our improved crate in its folded position. Fig. 2 is a side view and Fig. 3 is an end view of Fig. 1. Fig. 4 is a top view of the crate set up and with the lid of the hand-hole raised. Fig. 5 is a section on the line $a$—$a$ Fig. 4 of the cover only. Fig. 6 is a right hand side or end elevation of the crate set up as in Fig. 4 with most of the body broken away. Fig. 7 is a plan view of the crate folded as in Fig. 1 but with the cover omitted so as to show clearly the position of the folded side and end sections. Fig. 8 is an enlarged section on the line $b$—$b$ in Fig. 4. Fig. 9 is an inside elevation of the section 10 in Fig. 8. Fig. 10 is an inside elevation of the upper corner portion of one of the end sections or walls of the crate. Fig. 11 is a top view of the adjacent corners of Figs. 9 and 10 put together as when the crate is set up with the portion above the line $c$—$c$ in Fig. 9 broken away. Fig. 12 is Fig. 1 modified. Fig. 13 is an underside view of the board 18$^{aa}$ Fig. 12. Fig. 14 is Fig. 13 modified. Fig. 15 is a section on line $e$—$e$ Fig. 12. Fig. 16 is a section on line $d$—$d$ Fig. 14 with the board 21 added. Fig. 17 is an inside elevation of a corner of the crate, showing a modification of the means that hold the body sections to the base. Fig. 18 is a slightly enlarged section on line $x$—$x$ in Fig. 17. Fig. 19 is Fig. 17 modified. Fig. 20 is a section on the line $y$—$y$ in Fig. 19.

Referring to the drawings by reference numerals, 1 designates the bottom, of the crate; said bottom is practically solid and provided along its side and end edges with an upstanding rim 2, 2$^a$; said rim forming with the bottom a hollow base or shallow box with metallic corner pieces 3, each of which has an inwardly projecting lug 4 and a downward flange 5 (best shown in Figs. 7 and 8). Said shallow base is of sufficient depth to house the sections and cover of the crate when folded as in Figs. 7, 1 and 2.

Secured to the inner sides of each end of each wooden rim 2, 2 are plates 6 having slotted holes 7 (see Fig. 8) with a clearing 8 adjacent thereto in the rim; and the end rims 2$^a$ are provided with similar plates 6$^a$ having slotted holes 7$^a$ located lower down than slots 7. In said slots 7 are detachably inserted bayonet-shaped hinge members 9 secured on the end portions of the side sections 10 of the crate and having curved ends as shown the same as member 9$^a$ in Fig. 8, and in the slots 7$^a$ are inserted similar hinge members 9$^a$ of the end sections 10$^a$ of the crate. The lower position of the slots 7$^a$ is to allow the end sections of the crate to fold flat upon the bottom 1 and then the side sections to fold flat upon the end sections, the end sections with their hinges being of course slightly higher than the side sections so as to be even with the top of them when set up as shown in Fig. 8.

The peculiar double-hook shape of the hinge members 9 and 9$^a$, as best shown in the lower corner of Fig. 8, prevents vertical or upward displacement of the sections when they are set up, and horizontal displacement of them when they are in folded position; but by holding each section at an incline and pulling it away from the hinge plates 6 or 6$^a$, it may be detached therefrom. Such detaching is a great advantage as it enables all parts to be easily cleaned, or replaced or repaired, as may be required.

The upper corners of the side sections are preferably each provided with a clearing 11 (see Figs. 8, 9 and 11), partly covered by the wings 12 of a metal plate 13 having a rim 14 closing the end of the clearing or recess 11. For interlocking engagement with said plates 13 the end sections 10$^a$ have their corners provided each with a plate 15 (see Fig. 10) having a head 16 on a neck 17, which head when the sections are set up moves automatically into the recess 11 and takes hold of the wings 12 and the neck stops against the rim 14 so as to stop the outward swinging movement of the sections and hold them interlocked. In said vertical position the sections are held by inserting between them the cover of the crate.

Said cover is formed of longitudinal slats 18, 18ª, 18ᵃᵃ and 18ᵇ, which when the crate is set up rests with their ends upon reinforcing strips 19 of the end sections 10ª. The slats 18 are secured to end cleats 20 and a middle cleat or bar 21, while the slats 18ª, 18ᵃᵃ are secured to the shorter end slats 22 so as to form with them a slidable extension or section of the cover. To said extension is attached by hinges 23 the lid board 18ᵇ, which is provided near its middle with a hasp 25 having in its free end an aperture 26 and adapted to be swung sidewise in under a goose-neck plate 27 fixed on the bar 21 and provided with an aperture 28. Attached by a chain 29 to one of the sections is a cotter pin 30 designed to be pushed downward into the apertures 26 and 28 when they are in registering position, and thereby lock the hasp and the lid 18ᵇ. The hasp is formed with a shoulder 31 to stop against the edge of the plate 27, and said plate has an offset 32 to limit the swinging of the hasp, so that said shoulder and offset guide the apertures into registering position. For said purpose and to further hold the sliding cover sections locked, blocks 33 are secured upon the cleats 20 to resist the adjacent edge of the board or lid 18ᵇ. The cover is thus held with its corner fingers 34 pushed into metal loops 35 fixed upon the upward corners of the end sections 10ª, (see Fig. 4); and while thus held the ends of the cleats 20, 21 and 22 come so close to the sections 10 as to prevent sliding movement of the cover as a whole. But if the lid 18ᵇ be raised above the blocks 33, as in Fig. 4, the lid-carrying section of the cover may be slid inward from engagement with the loops 35 and raised so as to be pulled upon them and thereby disengage also the other cover section from the other loops 35, and the cover is set free to be removed. When the cover is placed upon the folded side and end sections of the crate (as in Fig. 1) the corners of the cover do not enter into the loops 35 but underneath four lugs 4, of the corner irons 3; and the ends of the cleats 21 22 butt loosely against the rims 2 of the bottom, and the ends of the cover fit between the rims 2ª.

As best shown in Figs. 4 and 5, underneath the middle bar 21 of the cover is secured a block 36 having a notch 37 in which is retained by a pin 38 a slide 39, preferably made of wire. When said slide or yoke is in the position shown in Fig. 4 it leaves two hand-holes, 40 and 41, through which two persons may operate to fill or empty the crate; but if there be only one operator, the slide may be pushed over one of the hand-holes to prevent unwarranted escape of chickens while the operator at the other opening can easily take care of the slightly enlarged opening through which he inserts or removes chickens.

Referring to some of the advantages and the improved construction more in detail, it will be seen that each plate 13 extends to both sides of the wood work and is riveted thereto; the plates 6, 6ª have each a lug 42 projecting in under the rim 2 or 2ª, and the hinge members 9, 9ª are formed with hooks 43 clasping the lower edges of the wooden legs of the sections and is also secured thereto by rivets 44, as best shown in Figs. 8 and 9, all of which features aid in the make up of a durable and reliable structure.

It will also be noted that each corner iron 3 serves several purposes, in that it strengthens the corner of the base, holds the cover down when the crate is folded, and the edge of it forms wearing surfaces and supports for the crate sections while they are being folded, unfolded and roughly handled in shipping and transportation. It is also a great advantage to have the corners of the cover lined with sheet iron, as shown, and provided with notches 45, since that enables the cover to have the corner fingers 34 located within its own outlines and not projected in any direction beyond the cover proper, to require extra space and liable to get damaged.

Among the greater advantages is the unobstructed bottom and top of the crate both in folded and in unfolded position, which admit of piling the crates freely one on the top of the other without danger of injuring them. To this may be added the concealed and protected position of the foldable parts when folded into the base; and the detachable connection of all sections for cleaning, exchange or repairs, as already mentioned.

As for modifications, it will be seen in Fig. 12 that the lid 18ᵇ may be reversed and hinged to the main cover section either by hinges like 23 secured on fixed blocks like 23ˣ (to the left), or without such blocks by large hinges like 23ˣˣ (to the right). In either event the blocks 33, if used, are secured upon the small bars 22 of the slidable cover section, 22, 18ª, 18ᵃᵃ, and the plate 27 is secured either to the bar 21, as in Figs. 12 and 15, or to the bar 18ᵃᵃ, as in Figs. 14 and 16. In either case the bar 18ᵃᵃ is provided with a recess 46 for the plate 27 and the hasp 25, and with a clearing hole 47 to house the head 48 of the pin 30 and to admit fingers to get hold of said head in extracting said pin.

While we have for convenience of description mostly referred to the invention as a crate, it is obvious that it is equally as applicable to folding boxes in general.

The means by which the sections may be attached to the base in either set up or folded position may be modified in several ways; thus in Figs. 17 and 18 we have shown that each body section 10 (or 10ª) may have its lower corners provided with L-shaped legs, 49, whose lower arm 50 is flat and adapted to slip into or out of a journal box 51 through a slit 52 when the section is held at an incline, said journal boxes being secured to the base or its rim. 10ˣ in Fig. 18 shows the inclined position of the section; but when the section is either set up or folded down, the cylindrical form of the journal box will prevent escape of the flat arm 50. 53 is an enlargement on the leg 49 to prevent the leg from slipping into the slit 52 and hinder folding of the section.

In Figs. 19 and 20 is shown how each section may have a low horizontal bar 54, which when the section is held at an incline as at 10ˣ in Fig. 20 will pass in and out between a block 55 secured on the rim and a block 56 secured upon the bottom 1 of the base, but when the section is set up it is held down by the block 55, and outward against the rim by the block 56; and when folded as at 10ˣˣ it is held in place by the cover and by the adjacent other sections folded in the limited space between the cover and the bottom to prevent sliding movement of the folded sections away from the places in which they are to be raised up again when the crate is next time to be set up.

What we claim is:

1. In a box or crate, the combination with a four-cornered bottom having a rigid upstanding rim all along its edges and inwardly projecting lugs upon the corners of said rim, of two end sections and two side sections forming the body of the crate and hingedly attached to the inner sides of said rim at such distances from the bottom that two opposite sections may fold flat upon the bottom and the other two sections may fold flat upon the first mentioned sections, and an unfoldable cover having a slightly slidable section whereby the cover may be retracted with its corners from under or projected in under the corner lugs, and means for locking the cover in said extended position; said cover when extended being of a size to substantially fill between the opposite straight portions of the rim so as to hold itself and the folded sections within the rim.

2. In a folding box or crate, the combination with a hollow base or shallow box, of side sections and end sections hingedly attached to the inner sides of said box so as to fold one pair upon the other parallel upon the bottom of the box; said box having inwardly projecting lugs for retaining a cover below them, a plane and extensible cover adapted to have its corners projected in under said lugs when placed upon the folded sections; means for locking the extensible cover in extended position, said cover being of a size to fill between the sides and ends of the shallow box when in extended position; two opposite ones of said foldable sections having each at its top an inward reinforcing strip and at each upper corner a metallic loop, and said cover being of a size to fill between the section of the crate when they are set up, and to rest with its ends upon the reinforcing strips; and fingers at the corners of the cover for engagement in said loops when the crate is set up and the cover extended.

3. In a folding box or crate, the combination with a body having a hollow base and side sections and end sections hinged to fold within said base and to be set up when so desired, of automatic interlocking means at the corners of said sections, and loops upon the upper corners of two of the sections, a cover substantially filling between all of the sections and having corner fingers arranged to engage in said loops to hold the cover in place; said cover comprising two sections, one slidable on the other in the direction of the corner fingers, an elongated aperture being formed between the two sections to serve as two hand-holes, a lid hinged to one of the cover sections and arranged to cover said aperture, means for locking said lid in closed position and thereby also locking the cover sections in extended position and interlocked in the loops.

4. In a folding box or crate, a cover composed of two sections slidable one on the other to make the cover extensible, an apertured offset locking plate fixed on one of the sections and an apertured hasp carried by the other section, locking means carried by one of the sections for insertion in said apertures when they are in registering position; and means for stopping the sliding movement of the sections automatically when they are extended so as to make the apertures register, said hasp being arranged to stop its swinging movement by contacting with the offset of the locking plate when the apertures are in registering position.

5. In a folding box or crate, the combination with a hollow base provided with inward corner lugs, or foldable body sections hinged to fold into the base and provided at their upper corners with loops, an extensible cover having corner fingers arranged to engage alternately under said lugs when the crate is folded and in said loops when the crate is set up; said fingers being all positioned within the outlines of the cover, so as not to require more space than that occupied by the cover.

6. A box or crate having a bottom, side and end sections hingedly attached to said bottom so as to fold flat one pair upon the other, automatic catches near the upper corners of the side and end sections, so as to prevent them from going beyond a vertical or set up position when raised up, an extensible cover, individual members carried by the cover, two opposite ones of said sections having at their upper edges individual members connecting with the individual members of the cover when the latter is in an extended position, so as to hold it in its place.

7. A box or crate having catches at its upper edges, a cover having catches adapted to engage in opposite directions into the catches on the box, said cover comprising two main sections slidable one on the other, a third cover section hinged to one of the main sections and arranged to enter between the adjacent edges of the main sections to hold the cover in extended position.

8. A box or crate having catches at its upper edges, a cover having catches adapted to engage in opposite directions into the catches on the box, said cover comprising two main sections slidable one on the other, a third cover section hinged to one of the main sections and arranged to enter between the adjacent edges of the main sections to hold the cover in extended position, and means for locking said third section when the cover is extended.

In testimony whereof we affix our signatures.

PETER CORNEL FLAGSTAD.
WALTER SANDS.

Copies of this patent may be obtained for five cents each, by addressing the "Commissioner of Patents, Washington, D. C."